US012019387B2

(12) United States Patent
Shida

(10) Patent No.: US 12,019,387 B2
(45) Date of Patent: Jun. 25, 2024

(54) IMAGE FORMING APPARATUS HAVING VOLTAGE CONTROL FOR IMPROVED IMAGE QUALITY

(71) Applicant: CANON KABUSHIKI KAISHA, Tokyo (JP)

(72) Inventor: Tomonori Shida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/980,666

(22) Filed: Nov. 4, 2022

(65) Prior Publication Data

US 2023/0168617 A1 Jun. 1, 2023

(30) Foreign Application Priority Data

Dec. 1, 2021 (JP) ................................ 2021-195263

(51) Int. Cl.
*G03G 15/16* (2006.01)
*G03G 15/00* (2006.01)
*G03G 15/01* (2006.01)

(52) U.S. Cl.
CPC ..... *G03G 15/5004* (2013.01); *G03G 15/0131* (2013.01); *G03G 15/1665* (2013.01)

(58) Field of Classification Search
USPC ........................................................ 399/298
See application file for complete search history.

(56) References Cited

U.S. PATENT DOCUMENTS

| | | | | |
|---|---|---|---|---|
| 9,864,318 B2 | 1/2018 | Minobe | | |
| 2016/0147182 A1* | 5/2016 | Yokoyama | ......... | G03G 15/1675 399/66 |

FOREIGN PATENT DOCUMENTS

| | | | | |
|---|---|---|---|---|
| JP | 2003295646 A | 10/2003 | | |
| JP | 2004045731 A | 2/2004 | | |
| JP | 2015184340 A | 10/2015 | | |
| JP | 2019120732 A | 7/2019 | | |
| WO | WO-2017138669 A1 * | 8/2017 | ............ | G03G 15/14 |

* cited by examiner

*Primary Examiner* — Quana Grainger
(74) *Attorney, Agent, or Firm* — ROSSI, KIMMS & McDOWELL LLP

(57) ABSTRACT

An image forming apparatus comprising a transfer means for transferring, a developer image onto a recording material; a discharging unit for discharging the recording material; a first circuit that applies a first voltage of reverse polarity to the developer to the transfer unit; a second circuit that applies a second voltage of identical polarity to the developer to the transfer unit and the discharging unit; and a control unit. The control unit applies a transfer voltage which is a superposition of the first and the second voltage to the transfer unit, and applies a discharging voltage which is a partial voltage from the second voltage. When the discharging voltage is set to the first value, the control unit reduces the discharging voltage in a case where the transfer voltage is lower than a target value.

10 Claims, 9 Drawing Sheets

*1 : PAPER-ABSENT IMPEDANCE DETECTION
*2 : FIRST CONSTANT VOLTAGE CONTROL
*3 : CONSTANT CURRENT CONTROL/ PAPER-PRESENT IMPEDANCE DETECTION
*4 : SECOND CONSTANT VOLTAGE CONTROL
*5 : PRINT GAP

FIG. 7

| DISCHARGING VOLTAGE | DISCHARGE MARK LEVEL |
|---|---|
| −0 (V) | × |
| −500 (V) | △ |
| −1000 (V) | ○△ |
| −1500 (V) | ○△ |
| −2000 (V) | ○ |

↓ USER-ACCEPTABLE LEVEL

FIG. 8A

| | (1) | (2) | (3) | (4) | (5) |
|---|---|---|---|---|---|
| SECONDARY TRANSFER TARGET VOLTAGE (V) | 2000 | 3000 | 4000 | 5000 | 6000 |
| POSITIVE VOLTAGE 200a OUTPUT (V) | 6000 | 7000 | 8000 | 8000 | 8000 |
| NEGATIVE VOLTAGE 200b OUTPUT (V) | −4000 | −4000 | −4000 | −4000 | −4000 |
| SECONDARY TRANSFER VOLTAGE (V) | 2000 | 3000 | 4000 | 4000 | 4000 |
| DISCHARGING VOLTAGE (V) | −2000 | −2000 | −2000 | −2000 | −2000 |
| TRANSFER DEFECTS | ○ | ○ | ○ | × | × |
| DISCHARGE MARKS | ○ | ○ | ○ | ○ | ○ |

FIG. 8B

| | (1) | (2) | (3) | (4) | (5) |
|---|---|---|---|---|---|
| SECONDARY TRANSFER TARGET VOLTAGE (V) | 2000 | 3000 | 4000 | 5000 | 6000 |
| POSITIVE VOLTAGE 200a OUTPUT (V) | 6000 | 7000 | 8000 | 8000 | 8000 |
| NEGATIVE VOLTAGE 200b OUTPUT (V) | −4000 | −4000 | −4000 | −3000 | −2000 |
| SECONDARY TRANSFER VOLTAGE (V) | 2000 | 3000 | 4000 | 5000 | 6000 |
| DISCHARGING VOLTAGE (V) | −2000 | −2000 | −2000 | −1500 | −1000 |
| TRANSFER DEFECTS | ○ | ○ | ○ | ○ | ○ |
| DISCHARGE MARKS | ○ | ○ | ○ | ○△ | ○△ |

*1 : PAPER-ABSENT IMPEDANCE DETECTION
*2 : FIRST CONSTANT VOLTAGE CONTROL
*3 : CONSTANT CURRENT CONTROL/ PAPER-PRESENT IMPEDANCE DETECTION
*4 : SECOND CONSTANT VOLTAGE CONTROL
*5 : PRINT GAP

IMAGE FORMING APPARATUS HAVING VOLTAGE CONTROL FOR IMPROVED IMAGE QUALITY

BACKGROUND OF THE INVENTION

Field of the Invention

The present invention relates to an image forming apparatus.

Description of the Related Art

In image forming apparatuses relying on an electrophotographic scheme, transfer voltage is outputted from a power source to a transfer member disposed opposing an image bearing member such as a drum-like photosensitive member or intermediate transfer member; as a result, a toner image that is born on the image bearing member becomes electrostatically transferred to a recording material such as paper. Thereafter, the recording material onto which the toner image has been transferred at a transfer portion formed by the image bearing member and the transfer member is transported to a fixing unit, and the toner image is fixed on the recording material by being heated and pressed at the fixing unit.

In such an image forming apparatus toner adheres to the transfer member in the course of the image forming operation; as a result, toner may adhere to the recording material that is thereafter transported to the transfer portion. With a view to preventing contamination of the recording material by toner adhered to the transfer member, therefore, a conventionally known configuration involves outputting to the transfer member, from a power source, voltage of a polarity opposite to that of the transfer voltage. This configuration allows keeping toner off the transfer member and suppressing adhesion of the toner to the transfer member, and allows also removing, and recovering, toner adhered to the transfer member. In this case the power source that outputs voltage to the transfer member can output voltage of both "positive polarity" and "negative polarity".

Japanese Patent Application Publication No. 2015-184340 discloses a configuration in which, to cope with ongoing reductions in the size of image forming apparatuses, there are shared a power source that outputs voltage to a discharging member for discharging a recording material, and disposed downstream of the transfer portion in the transport direction of the recording material, and a power source that outputs voltage to the transfer member, these power sources being connected in series. In the configuration of Japanese Patent Application Publication No. 2015-184340, static from the recording material having passed through the transfer portion may be discharged by the discharging member while the toner image is transferred from the image bearing member to the recording material at the transfer portion. In this case voltage of negative polarity is outputted from the power source to the discharging member, and a voltage resulting from superimposing voltages of negative polarity and positive polarity from the power source is outputted, to the transfer member, so as to maintain a transfer voltage that allows the toner image to be transferred at the transfer portion.

SUMMARY OF THE INVENTION

In a case however where a transfer voltage is formed through superposition of a positive voltage and a negative voltage, as in Japanese Patent Application Publication No. 2015-184340, the output of voltage of positive polarity needs to be increased in proportion to the voltage of negative polarity, as compared with an instance where only voltage of positive polarity is outputted from the power source to the transfer member.

Meanwhile, respective upper limit voltages that can be permissibly outputted by the power source are set for the circuit that outputs voltage of positive polarity and the circuit that outputs voltage of negative polarity.

A voltage close to the upper limit voltage is often used with a view to increasing image formation speed, prolonging life, and enabling image formation on various recording materials, in compact and inexpensive apparatuses. The voltage of positive polarity may in some instances reach the upper limit of voltage that can be outputted, when control is performed so that the output of transfer voltage increases as resistance increases accompanying the use of the transfer member. As a result, a transfer voltage resulting from superposition of voltages of negative polarity and positive polarity may fail to be sufficiently large (may fail to be obtained). Transfer defects may occur in such a case, in that the toner is not sufficiently transferred. A similar problem arises also when the positive polarity and the negative polarity are swapped.

It is an object of the present invention to suppress drops in image quality for instance derived from transfer defects, in an image forming apparatus in which voltages of positive polarity and negative polarity are superimposed and outputted from a common power source to a transfer member, and voltage of either polarity is further outputted from the common power source to a discharging member.

The present invention provides an image forming apparatus, comprising:

an image bearing member configured to bear a developer image;

a transfer unit configured to transfer, onto a recording material, the developer image born on the image bearing member;

a discharging unit configured to discharge the recording material;

a first circuit configured to apply a first voltage, which has an opposite polarity of a normal charging polarity of the developer, to the transfer unit;

a second circuit connected in series to the first circuit and configured to apply a second voltage, which has a same polarity of the normal charging polarity of the developer, to the transfer unit and the discharging unit; and a control unit configured to control the first circuit and the second circuit, wherein the control unit (i) applies to the transfer unit, as a transfer voltage, a superposition of the first voltage and the second voltage, so that the developer image is transferred to the recording material; and (ii) applies to the discharging unit, as a discharging voltage, a partial voltage from the second voltage, so that the recording material is discharged, wherein in a case where the transfer voltage is lower than a predetermined target value in a state where the discharging voltage of a first value is applied to the discharging unit, the control unit performs control of modifying the discharging voltage from the first value to a second value, the second value being a value of identical polarity to that of the first value, and being lower than the first value.

Further features of the present invention will become apparent from the following description of exemplary embodiments with reference to the attached drawings.

BRIEF DESCRIPTION OF THE DRAWINGS

FIG. 7 is a diagram for explaining the relationship between discharging voltage and image quality in Embodiment 1;

FIG. 8A and FIG. 8B are diagrams for explaining the relationship between voltage circuit output and image quality in Embodiment 1.

DESCRIPTION OF THE EMBODIMENTS

Preferred embodiments of the present invention will be explained hereafter in detail with reference to accompanying drawings. However, the dimensions, materials, shapes and relative positions of components described in the embodiments below are to be modified as appropriate depending on the configuration of the apparatus to which the present invention is applied, and depending on various conditions. Unless specifically indicated otherwise, therefore, the embodiments below are not meant to limit the scope of the invention in any way.

Embodiment 1

Configuration of an Image Forming Apparatus

Figure 1:
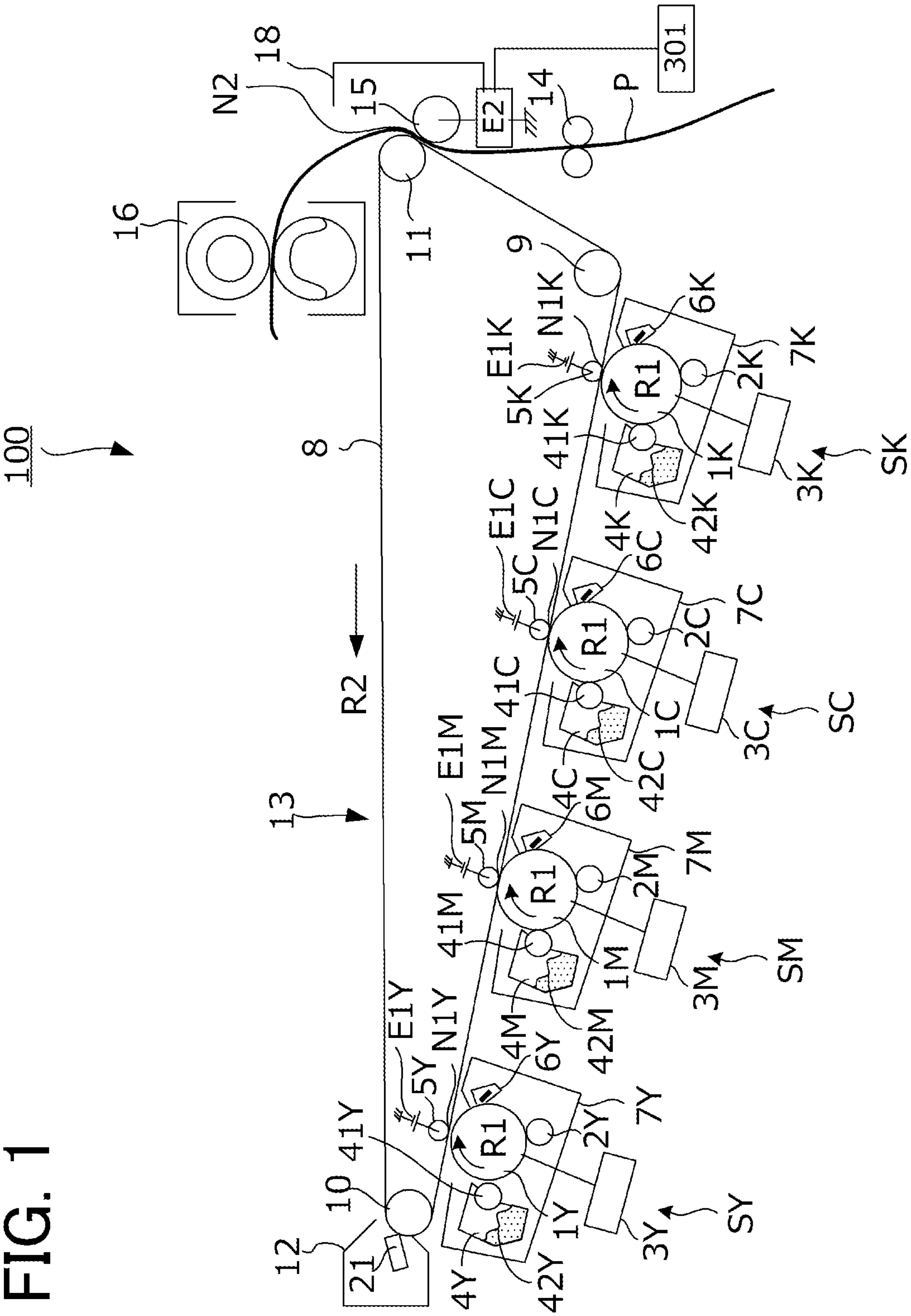
FIG. 1 is a schematic cross-sectional diagram for explaining the configuration of an image forming apparatus of Embodiment 1.

FIG. 1 is a schematic cross-sectional diagram for explaining the configuration of an image forming apparatus 100 of the present embodiment. The image forming apparatus 100 is a so-called tandem image forming apparatus having four image forming units SY, SM, SC, SK disposed in a row. The image forming units SY, SM, SC, SK form yellow (Y), magenta (M), cyan (C) and black (K) images, respectively. In the present embodiment the configurations and operations of the image forming units SY, SM, SC, SK are substantially identical, except that the colors of the toners (developers) used in the respective image forming units are different. In the explanation below, therefore, the suffixes Y, M, C, K of the reference symbols that denote elements for any of the colors will be omitted, unless the elements need to be distinguished from each other.

An image forming unit S has a drum-shaped (cylindrical) photosensitive drum 1 as a first image bearing member. The photosensitive drum 1 is rotationally driven in the direction of arrows R1 in the figure. The following units are sequentially disposed, around the photosensitive drum 1, along the direction of rotation of the photosensitive drum 1. Firstly there is disposed a charging roller 2 which is a roller-shaped charging member, as a charging unit, and then an exposure device 3 as an exposure unit, a developing apparatus 4 as a developing unit, and a drum cleaning device 6 as a cleaning unit for cleaning residual toner on the photosensitive drum 1.

The developing apparatus 4 accommodates a non-magnetic one-component toner as a developer, and has for instance a developing sleeve 41 as a developer carrier, and a developer applying blade 42 as a developer regulating unit. In each image forming unit S, the photosensitive drum 1, plus the charging roller 2, the developing apparatus 4 and the drum cleaning device 6 as process unit acting on the photosensitive drum 1, are integrally configured in the form of a process cartridge 7 that is attachable/detachable to/from the image forming apparatus 100. The exposure device 3 is made up of a scanner unit for scanning with laser light using a polygonal mirror, and that projects a modulated scanning beam onto the photosensitive drum 1, on the basis of an image signal.

An intermediate transfer belt 8 as a movable intermediate transfer member and which is a second image bearing member, is disposed so as to be in contact with all the photosensitive drums 1Y, 1M, 1C, 1K of the image forming units SY, SM, SC, SK. The intermediate transfer belt 8 is made up of an endless belt, and is spanned at a predetermined tension around three rollers, namely a drive roller 9, a tension roller 10 and a secondary transfer counter roller 11. An intermediate transfer motor (not shown) is connected to the drive roller 9, such that the drive roller 9 is rotationally driven through driving by the intermediate transfer motor having received an instruction from a control unit 301. In response to the rotation of the drive roller 9, the intermediate transfer belt 8 moves (rotates) in a belt transport direction denoted by arrow R2 in the figure.

A primary transfer roller 5 as a first transfer member is urged with a predetermined pressure against the photosensitive drum 1, via the intermediate transfer belt 8, to form a primary transfer portion (primary transfer nip) N1 in which the intermediate transfer belt 8 and the photosensitive drum 1 are in contact with each other. A secondary transfer roller 15 as a second transfer member is disposed at a position opposing the secondary transfer counter roller 11 on the outer peripheral surface side of the intermediate transfer belt 8. The secondary transfer roller 15 is urged with a predetermined pressure against the secondary transfer counter roller 11 across the intermediate transfer belt 8, to form a secondary transfer portion (secondary transfer nip) N2 in contact with the intermediate transfer belt 8, such that the secondary transfer roller rotates following the rotation of the intermediate transfer belt 8, directly or across a recording material P such as recording paper. A belt cleaning device 12 as an intermediate transfer member cleaning unit is disposed at a position opposing the tension roller 10 on the outer peripheral surface side of the intermediate transfer belt 8.

Figure 2:
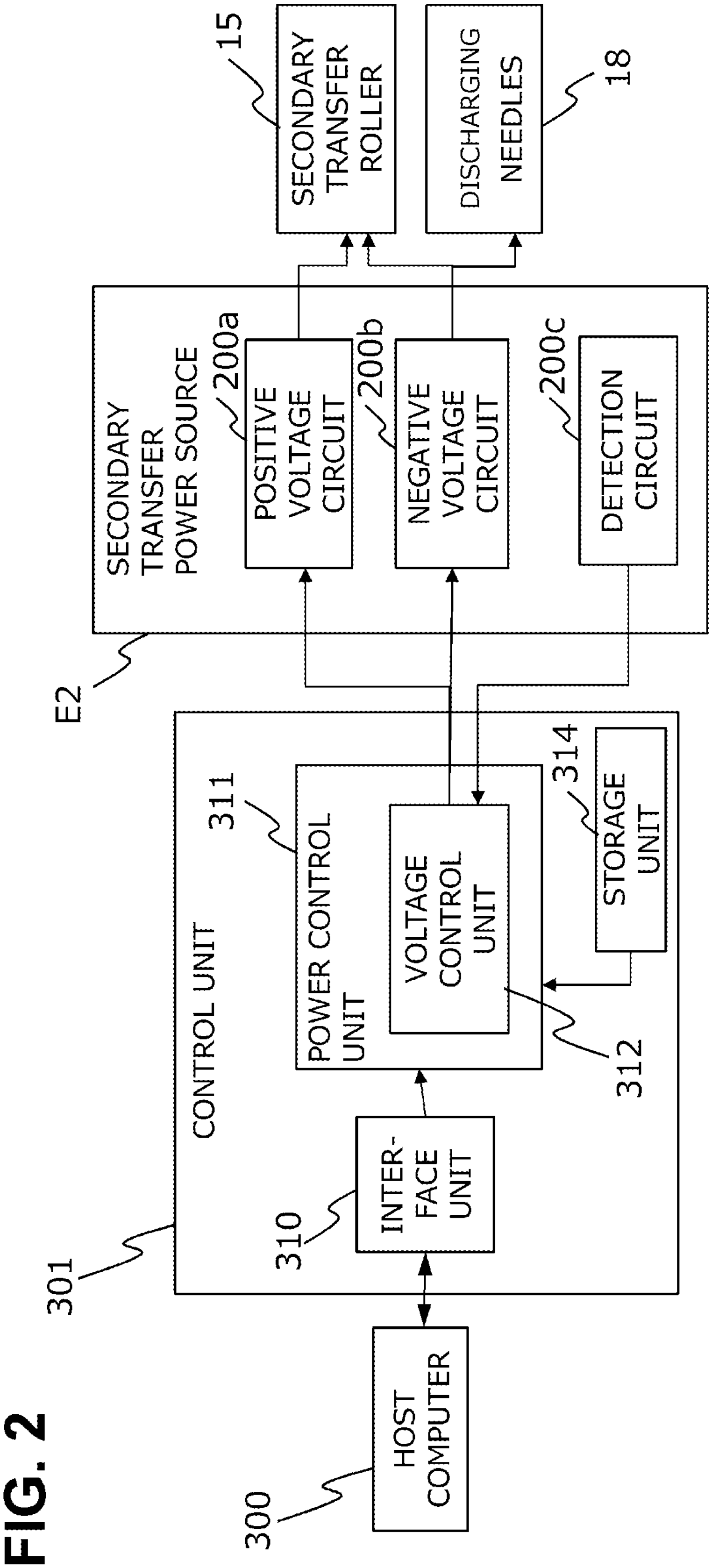
FIG. 2 is a block diagram illustrating the configuration of power supply control in Embodiment 1.

FIG. 2 is a block diagram of the image forming apparatus 100. The control unit 301 can communicate with a host computer 300. When an interface unit 310 of the control unit 301 receives (has inputted thereinto) print data from the host computer 300, the interface unit 310 extracts the print data, and converts the resulting data into image data for forming an image. Video signals for exposure in respective four colors are generated on the basis of the image data. Thereafter, once generation of the video signal is complete, an instruction to initiate image formation is sent from the interface unit 310 to a power control unit 311 which thereupon activates various actuators so as to initiate the preparation of image formation. The power control unit 311 can control a secondary transfer power source E2, as explained further on.

Upon start of the image forming operation, the photosensitive drums 1 and the intermediate transfer belt 8 start rotating in directions denoted by arrows R1 and R2, respectively, at a predetermined process speed. In the present embodiment the peripheral speed of the intermediate transfer belt 8 is set to 300 mm/sec as an image forming process speed; the intermediate transfer belt 8 rotates herein at substantially the same speed as the peripheral speed of the photosensitive drum 1. The surface of the rotating photosensitive drum 1 is charged substantially uniformly to a predetermined polarity (negative polarity in the present embodiment) by the charging roller 2. At this time, a predetermined charging voltage is applied to the charging roller 2 from a charging voltage application unit, not shown.

The surface of the charged photosensitive drum 1 is exposed next by the exposure device 3 in accordance with image information corresponding to each image forming unit S; as a result, an electrostatic latent image conforming to the image information becomes formed on the surface of the photosensitive drum 1. Meanwhile, toner in the developing apparatus 4 is negatively charged by the developer applying blade 42, and is applied to the developing sleeve 41. The normal charging polarity of the toner is negative herein, but is not limited thereto. A predetermined developing voltage is applied to the developing sleeve 41 by a developing voltage application unit, not shown. When the latent image formed on the photosensitive drum 1 reaches an opposing portion (developing portion) between the photosensitive drum 1 and the developing sleeve 41, the latent image on the photosensitive drum 1 is rendered visible by the toner of negative polarity, and a toner image (developer image) becomes formed on the photosensitive drum 1.

The toner image formed on the photosensitive drum 1 is transferred next (primary transfer) onto the intermediate transfer belt 8 that is rotationally driven through the action of the primary transfer roller 5, at the primary transfer portion N1. Herein a PEN (polyethylene naphthalate) resin is used as the intermediate transfer belt 8. The intermediate transfer belt 8 has a surface resistivity of $5.0\times10^{11}$ Ω/square and a volume resistivity of $8.0\times10^{11}$ Ωcm. Aside from that, a belt configured for instance as an endless belt formed of a resin such as PVdF (vinylidene fluoride resin), a polyimide or PET (polyethylene terephthalate) can be used as the intermediate transfer belt 8. Alternatively, a belt configured for instance as an endless belt formed by coating a base layer of rubber such as EPDM with a fluororesin such as PTFE dispersed in urethane rubber can be used as the intermediate transfer belt 8.

The primary transfer roller 5 is for instance made up of an elastic member such as sponge rubber. The primary transfer roller 5 of the present embodiment is a φ14 rubber roller resulting from coating a core bar on a nickel-plated steel bar, having a diameter of 6 mm, with foamed NBR-hydrin rubber having a thickness of 4 mm. The electrical resistance value of the primary transfer roller 5 is $1.0\times10^{6}$Ω. The electrical resistance value of the primary transfer roller 5 was measured by pressing both ends of the shaft of the primary transfer roller 5, at 500 g, against an aluminum cylinder having a diameter of 30 mm, and by applying 1000 V in a state where the primary transfer roller 5 was caused to rotate at 30 rpm. The atmospheric environment at the time of the measurement involves a temperature of 23° C. and humidity of 50%. The primary transfer roller 5 rotates in response to the movement of the intermediate transfer belt 8.

A primary transfer voltage is applied to the core bar of the primary transfer roller 5, from a primary transfer power source E1 as a primary transfer voltage application unit, at a reverse polarity of the normal charging polarity of the toner at the time of development (positive polarity in the present embodiment). To form for instance a full-color image, a latent image is formed on the photosensitive drum 1, at each color station, and each latent image is developed into a toner image. Then the toner images of respective colors formed on the respective photosensitive drums 1 of the respective image forming units S are transferred to the intermediate transfer belt 8 at respective primary transfer portions N1Y, N1M, N1C, N1K, so that the toner images are sequentially superimposed on each other, whereupon a full-color toner image of four colors becomes formed on the intermediate transfer belt 8.

The recording material P loaded in a recording material accommodating cassette, not shown, is transported up to registration rollers 14 as transport rollers, by a feed roller not shown, and an intermediate transport roller not shown. The registration rollers 14, the feeding roller, and the intermediate transport roller are rotationally driven by a drive force transmitted from a feeding motor as a second motor, via a drive train not shown. After correction of the skew of the recording material P by the registration rollers 14, the recording material P is transported to the secondary transfer portion N2 as a transfer portion formed by the secondary transfer counter roller 11 and the secondary transfer roller 15, via the intermediate transfer belt 8, in synchrony with the toner image on the intermediate transfer belt 8 as the image bearing member of the present embodiment. The four-color superimposed toner image born on the intermediate transfer belt 8 is transferred all at once onto the recording material P through the action of the secondary transfer roller 15, at the secondary transfer portion N2. At this time a secondary transfer voltage is applied, from the secondary transfer power source E2 to the secondary transfer roller 15, as a transfer voltage of reverse polarity (positive polarity in the present embodiment) of the normal charging polarity of the toner at the time of development.

For instance, the secondary transfer roller 15 is made up of an elastic member such as sponge rubber. The secondary transfer roller 15 of the present embodiment is a φ18 rubber roller resulting from coating a core bar on a nickel-plated steel bar, having a diameter of 8 mm, with foamed NBR-hydrin rubber having a thickness of 5 mm. The electrical resistance value of the secondary transfer roller 15 is $3.0\times10^{7}$Ω. The conditions for measuring the electrical resistance value of the secondary transfer roller 15 are identical to the conditions for each primary transfer roller 5. The secondary transfer roller 15 forms a secondary transfer portion N2 at a contact position with the intermediate transfer belt 8, and rotates following the movement of the intermediate transfer belt 8, or of the intermediate transfer belt 8 and the recording material P. In the present embodiment the secondary transfer counter roller 11, which is the counter electrode (counter member) of the secondary transfer roller 15, is a grounded nickel-plated aluminum roller, having a diameter of 20 mm. An elastic layer of low-resistance rubber or the like may be provided with a view to imparting elasticity to the surface of the secondary transfer counter roller 11.

Figure 3:
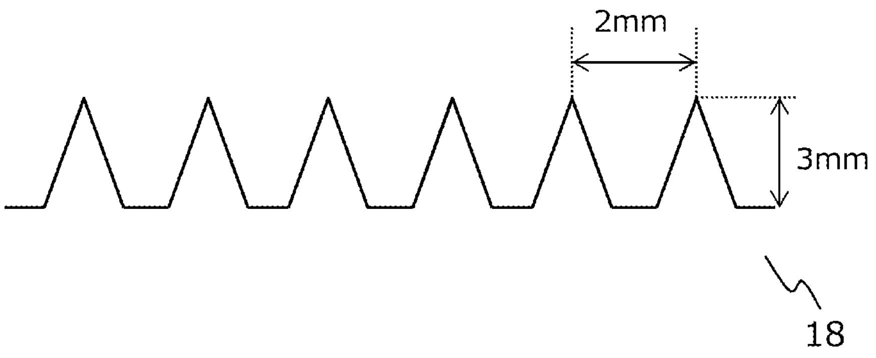
FIG. 3 is a schematic diagram of discharging needles of Embodiment 1.

Discharging needles 18, which are discharging members for removal of charge from the recording material P that passes through secondary transfer portion N2 (hereafter, for discharging of the recording material P), are disposed downstream of the secondary transfer portion N2 in the transport direction of the recording material P. The discharging needles 18 are made up of needle-shaped stainless steel with sharp tips, standing at a pitch of 2 mm, a height of 3 mm, and a thickness of 0.1 mm (FIG. 3). The discharging needles 18 have the function of generating ion flow at the tips, on account of electric field concentration, and of eliminating static from the recording material P. The shape of the discharging needles is not limited to the configuration described above, and it suffices that the shape be configured so as to be capable of eliminating static from the recording material P uniformly, over the entire length thereof.

The discharging needles 18 are connected to the secondary transfer power source E2, and a discharging voltage generated by the secondary transfer power source E2 is outputted at predetermined timings, to eliminate static from the recording material P. The discharging voltage outputted to the discharging needles 18 by the secondary transfer power source E2 has a polarity, i.e. a voltage of negative polarity, opposite to that of the secondary transfer voltage that is applied to the secondary transfer roller 15 during image formation. Through elimination of static from the recording material, the charge quantity on the recording material is reduced, and there is suppressed the occurrence of image defects derived from separation discharge of the recording material downstream of the secondary transfer portion N2.

The recording material P having had toner image transferred thereonto is thereafter transported to a fixing apparatus 16 as fixing unit. The recording material P is pressed and heated in the process of being transported while pinched between the fixing roller and a pressure roller of the fixing apparatus 16; the toner image becomes thereupon fixed to the recording material P. The recording material P having the toner image fixed thereon is then discharged out of the main body of the image forming apparatus 100. Toner remaining on the intermediate transfer belt 8 after transfer of the toner image onto the recording material P is removed from the intermediate transfer belt 8 by a cleaning blade 21 of the belt cleaning device 12.

Structure of the Secondary Transfer Power Source E2

Figure 4:
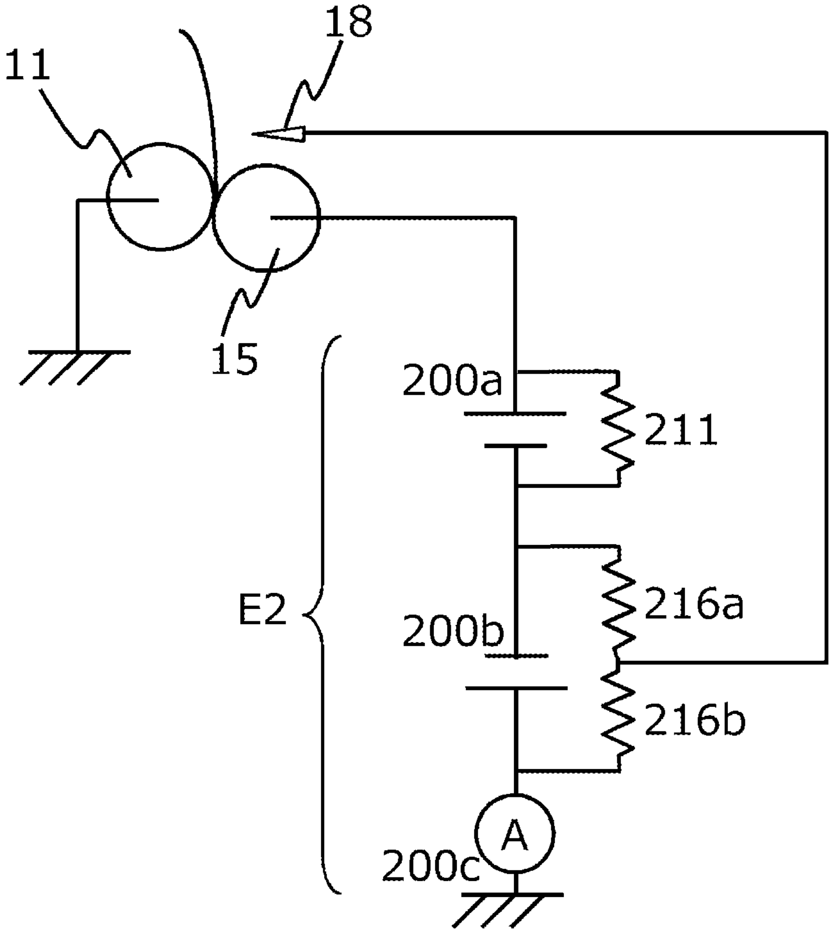
FIG. 4 is a circuit diagram of a secondary transfer power source of Embodiment 1.

FIG. 4 is a circuit diagram for explaining the configuration of the secondary transfer power source E2. The secondary transfer power source E2 includes a positive voltage circuit 200*a* as a first circuit, a negative voltage circuit 200*b* as a second circuit, and a current detection circuit 200*c* as a detection unit. The positive voltage circuit 200*a* and the negative voltage circuit 200*b* are connected in series, and the secondary transfer power source E2 functions as a common power source for the secondary transfer roller 15 and the discharging needles 18.

The positive voltage circuit 200*a* can generate transfer voltage for secondary transfer of the toner image to the recording material P; herein DC voltage (first voltage) of positive polarity (first polarity), which is a reverse polarity of the normal charging polarity of the toner, is outputted to the secondary transfer roller 15. The negative voltage circuit 200*b* outputs, to the secondary transfer roller 15, a DC voltage (second voltage) of negative polarity (second polarity), identical to the polarity of normal charging polarity of the toner. The negative voltage circuit 200*b* can generate voltage for causing the toner adhered to the secondary transfer roller 15 to migrate to the intermediate transfer belt 8, and be recovered by the belt cleaning device 12, and can generate discharging voltage that is outputted to the discharging needles 18 in order to eliminate static from the recording material P. The detection circuit 200*c* is a circuit for detecting current flowing towards the secondary transfer roller 15 from the positive voltage circuit 200*a*. The term "high/low" pertaining to voltage will be explained below on the basis of a potential difference from 0 V, regardless of whether the voltage is a positive voltage or a negative voltage. For instance −2000 V will be described as being a higher voltage than −1000 V.

Voltage of up to +8000 V can be outputted from the positive voltage circuit 200*a*, and voltage up to −5000 V can be outputted from the negative voltage circuit 200*b*. A resistor 211 and a resistor 216 are bleeder resistors of the positive voltage circuit 200*a* and of the negative voltage circuit 200*b*, respectively, and have resistance values of 120 MΩ and 20 MΩ, respectively. The negative voltage circuit 200*b* that outputs negative voltage is shared by the secondary transfer roller 15 and the discharging needles 18; herein the positive voltage circuit 200*a* and the negative voltage circuit 200*b* are connected to each other, and the generated DC high voltages are outputted to the secondary transfer roller 15 by way of the respective bleeder resistors. In consequence, a voltage resulting from superposition of the first voltage and the second voltage is applied to the secondary transfer roller 15, as a transfer voltage. As a result, in a case where the positive voltage circuit 200*a* and the negative voltage circuit 200*b* are turned on at the same time and the output voltages thereof are superimposed on each other, the potential of the ground level of the positive voltage circuit 200*a* drops by the absolute value of the negative voltage outputted by the negative voltage circuit 200*b*. That is, in a case where a transfer voltage is outputted from the secondary transfer power source E2 to the secondary transfer roller 15, for the purpose of secondary transfer of the toner image, the positive voltage circuit 200*a* outputs a positive voltage in proportion to the absolute value of the negative voltage outputted by the negative voltage circuit 200*b*.

The bleeder resistor 216 of the negative voltage circuit of the present embodiment is equally divided into 216*a* and 216*b*, such that half the negative voltage is outputted to the discharging needles. As a result, a partial voltage from the second voltage is applied to the discharging needles, as the discharging voltage. Even if the negative voltage circuit 200*b* is not generating a negative voltage, current flows in the bleeder resistors, and a voltage is generated as a result in the discharging needles, in accordance with the current flowing in the bleeder resistor and the bleeder resistance value. In a case where paper absorbs moisture in a high-temperature, high-humidity environment, constant-voltage control may be performed for the purpose of preserving proper image quality; a large current flows in that case in the secondary transfer roller 15 and also in the bleeder resistor. A high voltage is generated at this time in the discharging needles, and as a result, discharge from the discharging needles flows to the secondary transfer portion N2 across the paper, which may give rise to defective secondary transfer. In the present embodiment, therefore, the bleeder resistor is divided into two, to suppress the occurrence of such unintended voltage.

As another aspect of the present configuration, only half the voltage of the output of the negative voltage circuit 200*b* is outputted to the discharging needles; therefore, the negative voltage circuit 200*b* outputs a higher voltage in a case where a high discharging needle voltage is required. As a result, the positive voltage circuit 200*a* as well must generate a high voltage, in order to obtain the same secondary transfer voltage. As a concrete example, in a case where a transfer voltage of +3000 V and a discharging voltage of −1000 V are to be superimposed and outputted, the positive voltage circuit 200*a* needs to be controlled so as to output +5000 V(=3000 V+|−1000 V|×2). An instance where the bleeder resistor 216 is equally divided is explained herein, but the bleeder resistor need not be divided, depending on the configuration of the device, and the resistance ratio between 216*a* and 216*b* may be other than 1:1.

Upon start of the image forming operation, the power control unit 311 drives the secondary transfer power source E2 at a predetermined timing, by way of the voltage control unit 312. The power control unit 311 performs constant-current control or constant-voltage control on the basis of the voltage that is applied to the secondary transfer roller 15 by the secondary transfer power source E2 and on the basis of the current value detected by the current detection circuit 200*c*.

Secondary Transfer Control

In secondary transfer control there are performed constant-current control of controlling the output of the secondary transfer power source E2 so that a constant current flows in the secondary transfer roller 15, and constant-voltage control of outputting a constant voltage from the secondary transfer power source E2 to the secondary transfer roller 15. In order to perform constant-current control and constant-voltage control, a storage unit 314 has stored therein beforehand an array (hereafter LUT: lookup table) in which voltage set values at the time of control of the secondary transfer power source E2 by the power control unit 311 and voltage values actually outputted from the secondary transfer power source E2 are mapped to each other.

In constant-current control, the value of current flowing in the secondary transfer roller 15 is monitored by the detection circuit 200*c* at a predetermined cycle, and the voltage set value that is to be outputted from the secondary transfer power source E2 in the next cycle is determined in accordance with the difference between a target current value It and a detected current value Id. The value of current flowing in the secondary transfer roller 15 is controlled thereby so as to be constant.

Figure 5:
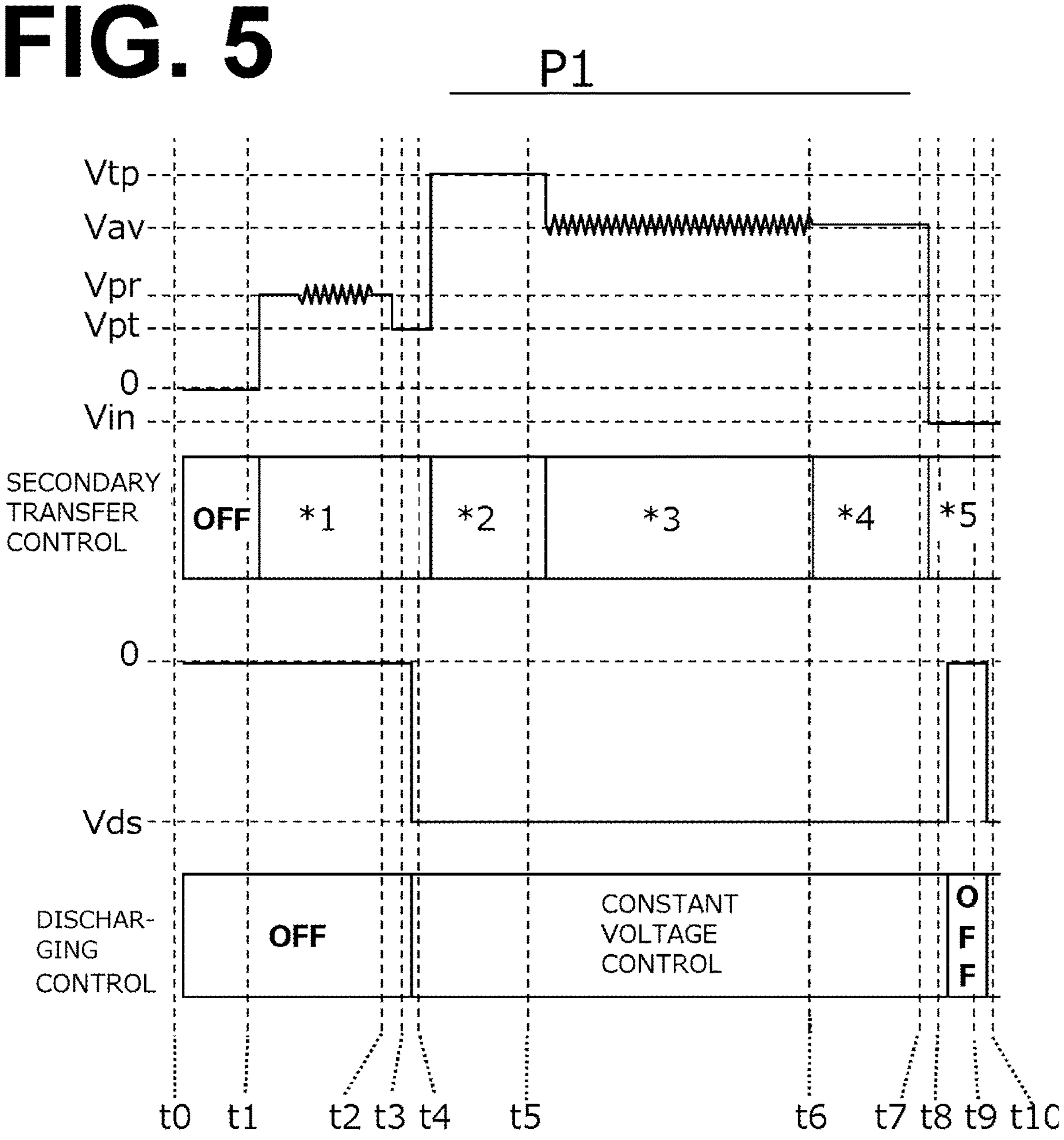
FIG. 5 is a timing chart for explaining secondary transfer control and discharging control in Embodiment 1.

An explanation follows next on the control (hereafter referred to as secondary transfer control) of the secondary transfer power source E2 at the time of secondary transfer of the toner image from the intermediate transfer belt 8 to the recording material P, at the secondary transfer portion N2. FIG. 5 is a timing chart (timings t0 to t10) of an instance where toner is transferred onto one sheet of recording material P (P1 in the figure) at the secondary transfer portion N2.

Constant-current control referred to as paper-absent impedance detection (timings t1 to t4) is performed before the leading end of the recording material P reaches the secondary transfer portion N2 in the transport direction of the recording material P. Impedance detection in the present embodiment involves acquiring a voltage value Vpr for obtaining a target current at the time of the above constant-current control. In paper-absent impedance detection, the impedance of the secondary transfer portion N2 is detected in a state where the recording material P is not nipped at the secondary transfer portion N2; in accordance with the obtained result, a voltage value is determined for constant-voltage control (timings t4 to t5, hereafter referred to as first constant-voltage control) that is thereafter carried out before and after the leading end of the recording material P reaches the secondary transfer portion N2. In the first constant-voltage control, a voltage value Vtp outputted to the secondary transfer roller 15 from the secondary transfer power source E2 has, on the basis of the installation environment of the apparatus and the type of the recording material P, a voltage set value Vtp0 as a reference based on the LUT stored in the storage unit 314 beforehand, and also a paper-absent impedance has a reference value Vpr0.

A difference (Vpr−Vpr0) between a paper-absent impedance detection result Vpr and the reference value Vpr0 and a difference (Vav−Vav0) between a paper-present impedance detection result Vav are substantially the same, and hence the target voltage of an instance where the recording material P is nipped at the secondary transfer portion N2 can be corrected on the basis of the paper-absent impedance detection result, as described below.

The above difference (Vpr−Vpr0) is added to the reference voltage Vtp0 in the first constant-voltage control; thus, the voltage value Vtp for the first constant-voltage control is given by Vtp=Vtp0+(Vpr−Vpr0).

By grasping the impedance at the secondary transfer portion N2 and adjusting the constant voltage value at the leading end of the recording material P it becomes thus possible to prevent transferability defects that arise at the leading end of the recording material P due to insufficient or excessive secondary transfer voltage at the leading end of the recording material P. Even if the electrical resistance value at the secondary transfer portion N2 fluctuates on account of the influence of the recording material P rushing into the secondary transfer portion N2, the first constant-voltage control allows nevertheless suppressing image damage occurring at the leading end of the recording material P on account of fluctuations in the voltage that is outputted from the secondary transfer power source E2. The first constant-voltage control in the present embodiment starts 5 mm before the recording material P reaches the secondary transfer portion N2, and is carried out until the position at 25 mm from the leading end of the recording material P reaches the secondary transfer portion N2.

After execution of the first constant-voltage control, the toner image is transferred from the intermediate transfer belt 8 to the recording material P while constant-current control is being carried out (timings t5 to t6). Constant-current control allows for proper secondary transfer of the toner image from the intermediate transfer belt 8 onto the recording material P, even if the environment (temperature, humidity) around the image forming apparatus 100 fluctuates, and even if differences arise derived from the type of the recording material P that is used for image formation. The storage unit 314 has stored therein values established beforehand for the target current It that is used in constant-current control, in accordance with the type of the recording material P and in accordance with the environment around the image forming apparatus 100.

Control referred to as paper-present impedance detection is performed in parallel with the constant-current control described above. Paper-present impedance detection is control performed in order to measure a voltage set value for optimal current flow, for the electrical resistance value at the secondary transfer portion N2, including the recording material P actually nipped at the secondary transfer portion N2. Paper-present impedance detection begins, after the start of constant-current control, from the point in time at which the detected current Id that is detected by the detection circuit 200*c* converges within a predetermined range relative to the target current It. Upon start of impedance detection, a secondary transfer voltage value is acquired 46 times in cycles of 4 msec, i.e. for one rotation of the secondary transfer roller 15, and there is calculated the average value thereof, i.e. the optimal voltage Vav for image formation. The acquisition cycle and acquisition count of the voltage set value can be selected depending on the device.

After constant-current control, constant-voltage control is then performed before and after the trailing end of the recording material P leaves the secondary transfer portion N2 in the transport direction of the recording material P (timings t6 to t7, hereafter referred to as second constant-voltage control). In the second constant-voltage control there is performed constant-voltage control through output of the voltage Vav from the secondary transfer power source E2 to the secondary transfer roller 15; this allows optimizing as a result the secondary transfer of the toner image at the trailing end of the recording material P. By executing the second constant-voltage control, variability in the voltage outputted from the secondary transfer power source E2 can be suppressed even if the electrical resistance value at the secondary transfer portion N2 fluctuates on account of the influence of the passage of the recording material P through the secondary transfer portion. Processing between prints (timings t7 to t10) is performed thereafter, in standby for the next recording material P.

Discharging Control

An explanation follows next on discharging control that is performed for eliminating static from the recording material P, through output of negative voltage to the discharging needles 18 from the negative voltage circuit 200*b* of the secondary transfer power source E2. The recording material P becomes strongly charged, and separation discharge of the recording material P occurs downstream of the secondary transfer portion, in the process of secondary transfer of the toner image; as a result, droplet-like discharge marks may become manifest on the image. In the discharging control, static from the recording material P is eliminated through constant-voltage control, and the above separation discharge is suppressed.

For the purpose of eliminating static from the recording material P, a voltage Vds as a discharging voltage that is to be outputted to the discharging needles 18 by the secondary transfer power source E2 is stored beforehand in the storage unit 314. In the present embodiment the discharging voltage to be outputted is determined in accordance with the type of recording material P and the environment around the image forming apparatus 100.

Secondary transfer control and discharging control, which are characterizing features of the present embodiment, have been thus explained. In the constant-current control described above, the target current value during control is determined so as to preclude transfer misses also in images on the recording material P with a large amount of toner per unit area, such as so-called secondary color solid images. The target current value is broadly determined taking into consideration for instance the triboelectric charge of the toner (charge quantity of the toner per unit volume), the amount of toner per unit area, and also the installation environment of the image forming apparatus, and the type of the recording material P.

The resistance values of the recording material P and of the secondary transfer roller 15 vary depending on the usage situation. In all cases, the higher the temperature and humidity of the surrounding environment, the lower is the resistance, whereas the lower the temperature and the humidity, the higher is the resistance. Specifically high voltage needs to be applied to the secondary transfer roller 15 for the purpose of ensuring secondary transferability in a low-temperature, low-humidity environment. In a same environment the resistance value tends to increase as the paper passes. That is, a higher voltage needs to be applied to the secondary transfer roller 15, in order to obtain the necessary secondary transfer current, in a case where an image forming apparatus is used in which a large volume of paper is run (hereafter referred to as apparatus after endurance paper running) in a low-temperature, low-humidity environment.

Figure 6:
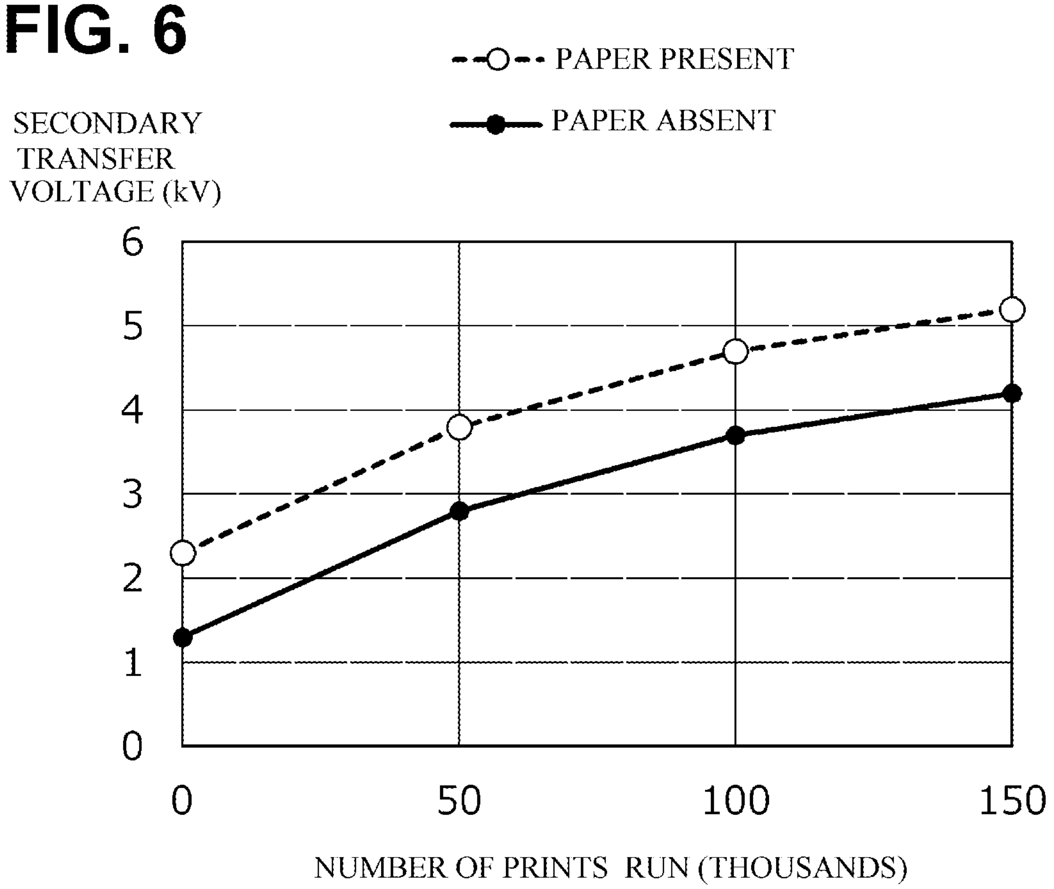
FIG. 6 is a diagram for explaining the change in impedance with the number of prints run, in Embodiment 1.

As an example, FIG. 6 illustrates the change in secondary transfer voltage necessary for ensuring transferability, as the apparatus is used, upon running of Canon CS-060F paper (basis weight 60 g/m$^2$) having been conditioned in a low-temperature, low-humidity environment of 15° C./10% RH for 2 days. Paper having been exposed to the environment for two days will hereafter be referred to as two-day exposed paper. At the early stage of the usage of the apparatus, the secondary transfer voltage at the time of constant-current control of a target current of 30 μA in a state where the recording material P was not nipped at the secondary transfer portion N2 i.e. the paper-absent impedance detection result Vpr0 as a reference was 1300 V, while the paper-present impedance detection result Vav0 with the recording material P nipped was 2300 V. The reference voltage Vtp0 of the first constant-voltage control is set to 2500 V. This reference voltage value Vtp0 is set to a slightly high voltage, so as not to preclude transfer defects in that toner is not sufficiently transferred, even with variability in the usage of the apparatus.

The secondary transfer voltage was observed to increase with use, such that after endurance running of 150K prints (150000 prints) of paper, the paper-absent impedance detection result Vpr rose up to 4200 V and the paper-present impedance detection result Vav rose up to 5200 V. This indicates that the resistance of the secondary transfer roller 15 increases as more prints are run. It is also found that the required secondary transfer voltages Vtp, Vav can be predicted (Vtp=Vpr+1200, Vav=Vpr+1000) on the basis of the paper-absent impedance detection result Vpr, according to the recording material P.

In discharging control the voltage value for discharging control is determined so as to eliminate static from the recording material P, downstream of the secondary transfer portion N2 in the transport direction of the recording material P, for the purpose of preventing the above-described discharge marks, which occur readily on a recording material P of low basis weight and high resistance. A high voltage is required in order to accomplish necessary and sufficient discharging from paper that is prone to giving rise to discharge marks such as those described above.

The CS-060F paper above has comparatively high resistance, and becomes charged up in the process of toner image transfer at the secondary transfer portion N2, and is thus one kind of paper that is prone to giving rise to discharge marks, regardless of the operating environment of the apparatus. In any environment, the occurrence of discharge marks can be broadly suppressed through application of a discharging voltage of −1000 V or higher. However, it is effective to apply a higher discharging voltage, for the purpose of reducing the occurrence frequency of discharge marks as much as possible. FIG. 7 illustrates results of such discharge marks in a low-temperature, low-humidity environment. The occurrence of discharge marks is rated as "good" (○), (when the occurrence is suppressed), as "problematic" (×) (when the occurrence is conspicuous), and as "moderate" (Δ). The ratings "good" and "moderate" denote occurrence of discharge marks at or below an acceptable level for the user. At a discharging voltage lower than −1000 V the occurrence of discharge marks was conspicuous and above the user's acceptable level; the occurrence of discharge marks was suppressed however through application of a high discharging voltage, of −1000 V or higher, while no discharge marks occurred at −2000 V. Therefore, a discharging voltage of −2000 V is ordinarily applied to reduce the occurrence of the discharge marks to substantially zero. This discharging voltage of −2000 V is taken as a first value.

In a case where as described above the upper limit of the voltage that can be outputted from the positive voltage circuit 200*a* is 8000 V, and a discharging voltage of −2000 V is applied, then the maximum voltage that can be applied to the secondary transfer roller 15 is +4000 V, since −4000 V is superimposed on the output from the positive voltage circuit 200*a*, in terms of the circuit configuration. FIG. 8A and FIG. 8B each set out the secondary transfer target voltage which is a predetermined target value for ensuring transferability, the outputs of the positive voltage circuit 200*a* and the negative voltage circuit 200*b*, the relationship between the secondary transfer voltage value and the discharging voltage value that is actually obtained, and image quality indices in the form of the occurrence level of transfer defects in which toner is not sufficiently transferred, and of discharge marks. The rating (O) denotes "good" (occurrence suppressed) and the rating (×) denotes "problematic" (conspicuous occurrence), of transfer defects and discharge marks, and the ratings "O" and "Δ" denote occurrence of the foregoing at a level acceptable by the user.

A conventional example of control will be explained first with reference to FIG. 8A. The apparatus is operated so that the secondary transfer voltage and the discharging voltage yield the respective target outputs, although no voltage can be outputted beyond the upper limit of high voltage output of each circuit. As described above, a secondary transfer voltage of +5200 V is required in the apparatus after endurance paper running; however, only a secondary transfer voltage of up to +4000 V can be outputted in a case where a discharging voltage of −2000 V is applied, regardless of the impedance of the secondary transfer portion N2, as in FIG. 8A. A target current of 30 μA cannot be obtained at +4000 V, and accordingly a transfer defects occurs in that toner on the intermediate transfer belt 8 is not sufficiently transferred onto the recording material P (see (4) and (5) in FIG. 8A). On the other hand, no discharge marks occur herein. From the standpoint of image quality it is desirable to endeavor to suppress transfer defects rather than discharge marks, which occur infrequently.

FIG. 8B depicts an example of an instance in which there is executed control that is the characterizing feature of the present embodiment; herein the predetermined target value of the secondary transfer voltage is identical to that in FIG. 8A. In FIG. 8B, a sufficient voltage in terms of image quality is applied as the secondary transfer voltage and as the discharging voltage, in a case where the output of the positive voltage circuit 200*a* does not reach the maximum value of 8000 V (first mode; (1) and (2) in FIG. 8B).

In a case in FIG. 8B where, on the other hand, a high voltage is preferable as both the secondary transfer voltage and the discharging voltage, the discharging voltage is reduced and transferability at the secondary transfer portion N2 is given priority. In a case in the present embodiment where the output voltage from the positive voltage circuit 200*a* has reached the upper limit of 8000 V (second mode), the secondary transfer voltage is secured at which the target secondary transfer current is obtained, and the output of the negative voltage circuit 200*b* is reduced. In a case in the present invention where the paper-absent impedance detection result Vpr above is 2800 V or lower, the secondary transfer voltage is also kept at 4000 V or lower, including also the first constant-voltage control voltage Vtp in a state where the recording material P is nipped at the secondary transfer portion N2. Accordingly, −2000 V which is the above first value can be applied as the discharging voltage (see (1) to (3) in FIG. 8B).

In a case on the other hand where the secondary transfer voltage drops below the target value while the discharging voltage remains at −2000 V, i.e. in a case where the paper-absent impedance detection result Vpr exceeds 2800 V, the output of the positive voltage circuit 200*a* is set to the upper limit of 8000 V and the output of the negative voltage circuit 200*b* is reduced, to lower the discharging voltage (see (4) and (5) in FIG. 8B). The discharging voltage in this case has the same polarity as that of first value, and is lower than the first value; this discharging voltage is set the second value. At this time −(8000−(Vpr+1200)) V is outputted from the negative voltage circuit 200*b*, and the discharging voltage becomes −((8000−(Vpr+1200))/2) V. A comparison between (4) and (5) in the conventional FIG. 8A reveals that in a case where the discharging voltage is set to −2000 V, the difference with respect to the target value of the secondary transfer voltage is larger in (5) than in (4). Therefore, the secondary transfer voltage takes on a target value, in FIG. 8B of the present embodiment, by reducing the value of the discharging voltage to be lower in the case of (5) than in the case of (4).

As an effect of the control of the present embodiment, it was possible to suppress transfer defects, and also to suppress discharge marks, so as to lie within acceptable ranges in the range of usage of the of the positive voltage circuit 200*a* and the negative voltage circuit 200*b*.

Thus far the intermediate transfer belt 8 in a color image forming apparatus of intermediate transfer type has been explained as an image bearing member; however, the effect of the present embodiment remains identical for instance also in monochrome printers in which a transfer portion is formed through pressing of a photosensitive member which is a first image bearing member and a transfer roller, and in which a toner image is transferred to the recording material P while the recording material P is nipped at the transfer portion.

Embodiment 2

Another embodiment of the present invention will be explained next. The basic configuration and operation of the image forming apparatus of the present embodiment are identical to those of the image forming apparatus of Embodiment 1. In the image forming apparatus of the present embodiment, therefore, elements having an identical or corresponding function or configuration to those of the image forming apparatus of Embodiment 1 will be denoted by the same reference numerals as those of Embodiment 1, and a detailed explanation thereof will be omitted.

In Embodiment 1 an instance has been explained in which the output of the negative voltage circuit 200*b* is suppressed on the basis of the paper-absent impedance detection result Vpr; in Embodiment 2 an instance will be explained in which the output of the negative voltage circuit 200*b* is controlled on the basis of the paper-present impedance detection result Vav.

Figure 9:
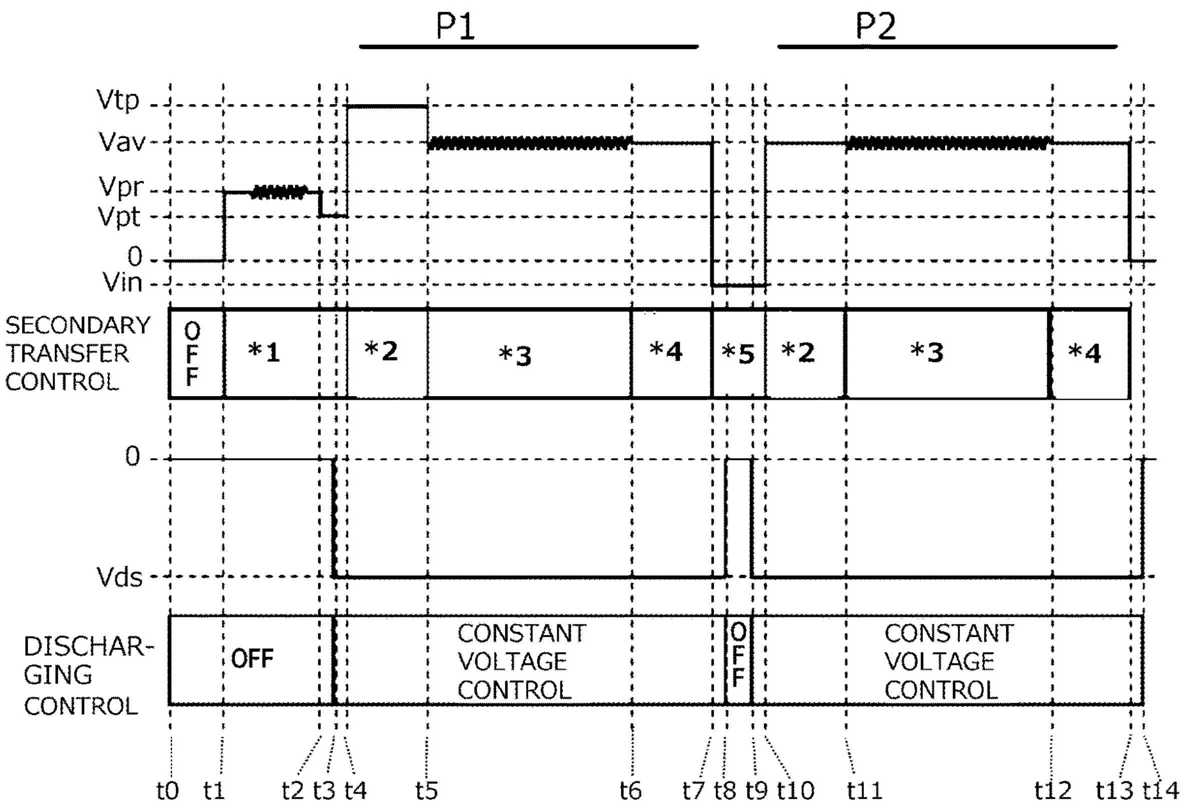
FIG. 9 is a timing chart for explaining secondary transfer control and discharging control in Embodiment 2.

FIG. 9 illustrates a timing chart of the present embodiment. An example of consecutive printing of two prints of the recording material P is illustrated herein. After voltage control for the first recording material P1 (timings t1 to t7), voltage control for a second recording material P2 (timings t10 to t13) is performed following a print gap (timings t7 to t10).

As explained in Embodiment 1, the paper-present impedance detection allows calculating an optimal voltage Vav for image formation in a constant-current control region of the recording material P. Paper-present impedance detection is advantageous in that the voltage value of the first constant-voltage control can be optimized in a recording material P (P2 in the figure) of a second and subsequent transfers in the case of continuous paper running.

As a characterizing feature, the present embodiment allows correcting deviations of the paper-absent impedance detection result Vpr on the basis of the paper-present impedance detection result Vav, and allows setting a more optimal voltage Embodiment 1, for the following reasons.

As explained in Embodiment 1, in predicting the secondary transfer voltage necessary for a state in which the recording material P is nipped at the secondary transfer portion N2, on the basis of the impedance Vpr at the secondary transfer portion N2 without the recording material P nipped therein, in paper-absent impedance detection, variability arose in paper-present impedance and in paper-absent impedance on account for instance of variability in components and the degree of affinity with the environment in which the recording material P is used, and some deviation occurred in the secondary transfer voltage. This might result in transfer defects, or conversely, in low density referred to as a conspicuous transfer miss and which occurs in a case where the secondary transfer voltage setting its excessively high, in a 25 mm region of the leading end of the recording material P at which there is performed the first constant-voltage control explained in Embodiment 1. In a case by contrast where paper-present impedance detection of the present embodiment is resorted to, deviations in secondary transfer voltage can be suppressed, since an optimal transfer voltage of the recording material P being run can be grasped exactly.

As explained in Embodiment 1, the difference between the paper-present impedance detection result Vav and the paper-absent impedance detection result Vpr was 1000 V when using CS-060F paper having been allowed to stand for two days in a low-temperature, low-humidity environment of 15° C./10% RH. By contrast, Vav−Vpr was 500 V for the above paper immediately after being unwrapped in a low-temperature, low-humidity environment (hereafter, freshly unwrapped paper). In another comparison, the difference in the impedance detection results was large up to Vav−Vpr of 1500 V, for one-month exposed paper that was the above paper having been allowed to stand for one month in a low-temperature, low-humidity environment. A time lag for adaptation of the same CS-060F paper to a low-temperature, low-humidity environment is explained herein, but a similar explanation applies as well to a difference in the type of the recording material P.

Based on the control in Embodiment 1 the first constant-voltage control value is thus 500 V too high for the above freshly unwrapped paper, and low-density-like transfer defects occur referred to as conspicuous transfer misses; also, the first constant-voltage control value is insufficient by 500 V for the above one-month exposed paper, and transfer defects occur likewise.

Control in the present embodiment, by contrast, allows the paper-present impedance detection result Vav, obtained through running of the recording material P, to be applied as the first constant voltage value Vtp of the recording material P on which an image is to be formed next; as a result, an optimal voltage value is obtained also at the leading end of the image. In addition, an optimal discharging voltage can be set within a range that does not exceed the upper limit of high voltage output.

In the present embodiment, the first print in a print job is controlled based on the paper-absent impedance detection explained in Embodiment 1, while for the second and subsequent prints, the outputs of the positive voltage circuit 200*a* and of the negative voltage circuit 200*b* are established on the basis of a voltage value acquired through paper-present impedance detection control during running of the first print; it becomes possible to set a voltage for achieving optimal image quality, from the leading end of the recording material P, using voltage within an upper limit that can be outputted from a voltage circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-195263, filed Dec. 1, 2021, which is hereby incorporated by reference wherein in its entirety.

What is claimed is:

1. An image forming apparatus, comprising:

an image bearing member configured to bear a developer image;

a transfer unit configured to transfer, onto a recording material, the developer image borne on the image bearing member;

a discharging unit configured to discharge the recording material;

a first circuit configured to apply a first voltage, which has an opposite polarity of a charging polarity of developer, to the transfer unit;

a second circuit connected in series to the first circuit and configured to apply a second voltage, which has a same polarity as the charging polarity of the developer and an absolute value of the second voltage smaller than that of the first voltage, to both the transfer unit and the discharging unit;

a control unit configured to control the first circuit and the second circuit; and a detection unit configured to detect a current value flowing in the transfer unit, wherein the control unit (i) is configured to apply to the transfer unit, as a transfer voltage, the first voltage or a sum of the first voltage and the second voltage and (ii) apply to the discharging unit, as a discharging voltage, a partial voltage from the second voltage, so that the recording material is discharged, and wherein:

in a case where the transfer voltage is higher than a predetermined target value in a state where only the first voltage is applied to the transfer unit as the transfer voltage by the control unit so that the current value detected by the detection unit is constant, when the recording material is nipped between the transfer unit and the image bearing member, the sum of the first voltage and the second voltage is applied to the transfer unit as the transfer voltage and the discharging voltage is a first value;

in a case where the transfer voltage is lower than the predetermined target value in a state where only the first voltage is applied to the transfer unit as the transfer voltage by the control unit so that the current value detected by the detection unit is constant, when the recording material is nipped between the transfer unit and the image bearing member, the sum of the first voltage and the second voltage is applied to the transfer unit as the transfer voltage and the discharging voltage is a second value;

the second value is a value of a same polarity as that of the first value; and an absolute value of the second value is higher than that of the first value.

2. The image forming apparatus according to the claim 1, wherein the discharging unit is provided downstream of the transfer unit, in a transport direction of the recording material.

3. The image forming apparatus according to the claim 1, wherein the control unit is configured to determine the second value in accordance with a difference between the transfer voltage and the predetermined target value in a state where the transfer voltage is controlled by the control unit so that the current value detected by the detection unit is constant.

4. The image forming apparatus according to the claim 3, wherein the larger an absolute value of the difference between the transfer voltage and the predetermined target value in a state where the transfer voltage is controlled by the control unit so that the current value detected by the detection unit is constant, the greater the difference between the absolute value of first value and the absolute value of the second value.

5. The image forming apparatus according to the claim 1, wherein the detection unit is configured to detect the value of the current in a state where the recording material is not nipped between the transfer unit and the image bearing member, wherein the control unit is configured to determine the predetermined target value of the transfer voltage in a state where the recording material is nipped between the transfer unit and the image bearing member on the basis of the current value detected by the detection unit in a state where the recording material is not nipped between the transfer unit and the image bearing member.

6. The image forming apparatus according to the claim 1, wherein the image bearing member is an intermediate transfer member configured to bear the developer image transferred from the surface of a photosensitive member.

7. The image forming apparatus according to the claim 1, wherein the image bearing member is a photosensitive member on the surface of which the developer image is formed.

8. An image forming apparatus, comprising:

an image bearing member configured to bear a developer image;

a transfer unit configured to transfer, onto a recording material, the developer image borne on the image bearing member;

a discharging unit configured to discharge the recording material;

a first circuit configured to output a first voltage which has a first polarity to the transfer unit;

a second circuit configured to output a second voltage, which has an opposite polarity of the first polarity and an absolute value of the second voltage is smaller than that of the first voltage, to both the transfer unit and the discharging unit; and a control unit configured to control the first circuit and the second circuit, wherein:

the developer image is transferred to the recording material at a transfer voltage which is determined on the basis of the first voltage and the second voltage;

a discharging voltage, which is a partial voltage divided from the second voltage by the second circuit, is applied to the discharging unit;

the control unit configured to perform:

a first mode in which the transfer voltage of the transfer unit is set to a first transfer voltage and the developer image is configured to be transferred to the recording material at the first transfer voltage; and a second mode in which the transfer voltage of the transfer unit is set to a second transfer voltage which has a same polarity as the first transfer voltage and an absolute value of the second transfer voltage smaller than that of the first transfer voltage and the developer image is configured to be transferred to the recording material by the second transfer voltage, and wherein the control unit applies a first discharging voltage as the discharging voltage when operating in the first mode, and, applies a second discharging voltage, which has a same polarity as the first discharging voltage and an absolute value of the second discharging voltage smaller than that of the first discharging voltage, as the discharging voltage when operating in the second mode.

9. An image forming apparatus, comprising:

an image bearing member configured to bear a developer image;

a transfer unit configured to transfer, onto a recording material, the developer image borne on the image bearing member;

a discharging unit configured to discharge the recording material;

a first circuit configured to apply a first voltage, which has an opposite polarity of a charging polarity of developer, to the transfer unit;

a second circuit connected in series to the first circuit and configured to apply a second voltage, which has a same polarity as the charging polarity of the developer and an absolute value of the second voltage smaller than that of the first voltage, to both the transfer unit and the discharging unit;

a control unit configured to control the first circuit and the second circuit; and a detection unit configured to detect a current value flowing in the transfer unit, wherein the control unit (i) is configured to apply to the transfer unit, as a transfer voltage, a sum of the first voltage and the second voltage; and (ii) apply to the discharging unit, as a discharging voltage, a partial voltage from the second voltage, so that the recording material is discharged, and wherein:

in a case where the transfer voltage is higher than a predetermined target value in a state where the sum of the first voltage and the second voltage is applied to the transfer unit as the transfer voltage by the control unit and a first recording material is nipped between the transfer material and the image bearing member, when a second recording material is nipped between the transfer unit and the image bearing member, the sum of the first voltage and the second voltage is applied to the transfer unit as the transfer voltage, and, the discharging voltage is a first value;

in a case where the transfer voltage is lower than the predetermined target value in a state where the sum of the first voltage and the second voltage is applied to the transfer unit as the transfer voltage by the control unit and a first recording material is nipped between the transfer unit and the image bearing member , when a second recording material is nipped between the transfer unit and the image bearing member, the sum of the first voltage and the second voltage is applied to the transfer unit as the transfer voltage, and, the discharging voltage is a second value;

the second value is a value of a same polarity as that of the first value; and an absolute value of the second value is higher than that of the first value.

10. The image forming apparatus according to the claim 9, wherein:

the control unit determines the predetermined target value of the transfer voltage by controlling the transfer voltage so that the current value detected by the detection unit is constant;

wherein the detection unit is configured to detect the value of the current value in a state where a first recording material is nipped between the transfer unit and the image bearing member, wherein the control unit is configured to determine, on the basis of the value of the current value detected by the detection unit in a state where a first recording material is nipped between the transfer unit and the image bearing member, the predetermined target value of the transfer voltage for a second recording material to which the developer image is transferred after the first recording material.

* * * * *